United States Patent [19]

Okamura

[11] Patent Number: 4,711,333

[45] Date of Patent: Dec. 8, 1987

[54] SYSTEM FOR CONTROLLING A TRANSFER CLUTCH OF A FOUR-WHEEL DRIVE VEHICLE

[75] Inventor: Minoru Okamura, Tokyo, Japan

[73] Assignee: Fuji Jukogyo Kabushiki Kaisha, Tokyo, Japan

[21] Appl. No.: 856,062

[22] Filed: Apr. 24, 1986

[30] Foreign Application Priority Data

Apr. 30, 1985 [JP] Japan .................................. 60-92976

[51] Int. Cl.⁴ ...................... B60K 41/04; B60K 41/28; F16D 43/22
[52] U.S. Cl. .............................. 192/0.076; 192/0.032; 192/0.044; 192/0.09
[58] Field of Search ............... 192/0.075, 0.034, 0.033, 192/0.03, 0.076, 0.044, 0.09, 0.092, 3.56, 3.58, 58 C, 58 B, 0.032; 74/710, 710.5

[56] References Cited

U.S. PATENT DOCUMENTS

| | | | |
|---|---|---|---|
| 4,481,877 | 11/1984 | Takano et al. | 192/0.032 X |
| 4,562,897 | 1/1986 | Renneker | 192/58 B X |
| 4,583,627 | 4/1986 | Kumura et al. | 192/0.076 |
| 4,605,112 | 8/1986 | Takano | 192/0.076 X |

FOREIGN PATENT DOCUMENTS 84227 5/1982 Japan .

Primary Examiner—George H. Krizmanich
Attorney, Agent, or Firm—Martin A. Farber

[57] ABSTRACT

A four-wheel drive vehicle has an engine clutch for transmitting the output of an engine to a transmission, main drive wheels operatively connected to an output shaft of the transmission, auxiliary drive wheels, and a transfer clutch for transmitting the output of the transmission to the auxiliary drive wheels. A control system is provided with a detector for detecting a driving condition for reducing the torque capacity of the transfer clutch. The control system responds to a signal from the detector for gradually reducing the torque capacity of the transfer clutch.

10 Claims, 17 Drawing Figures

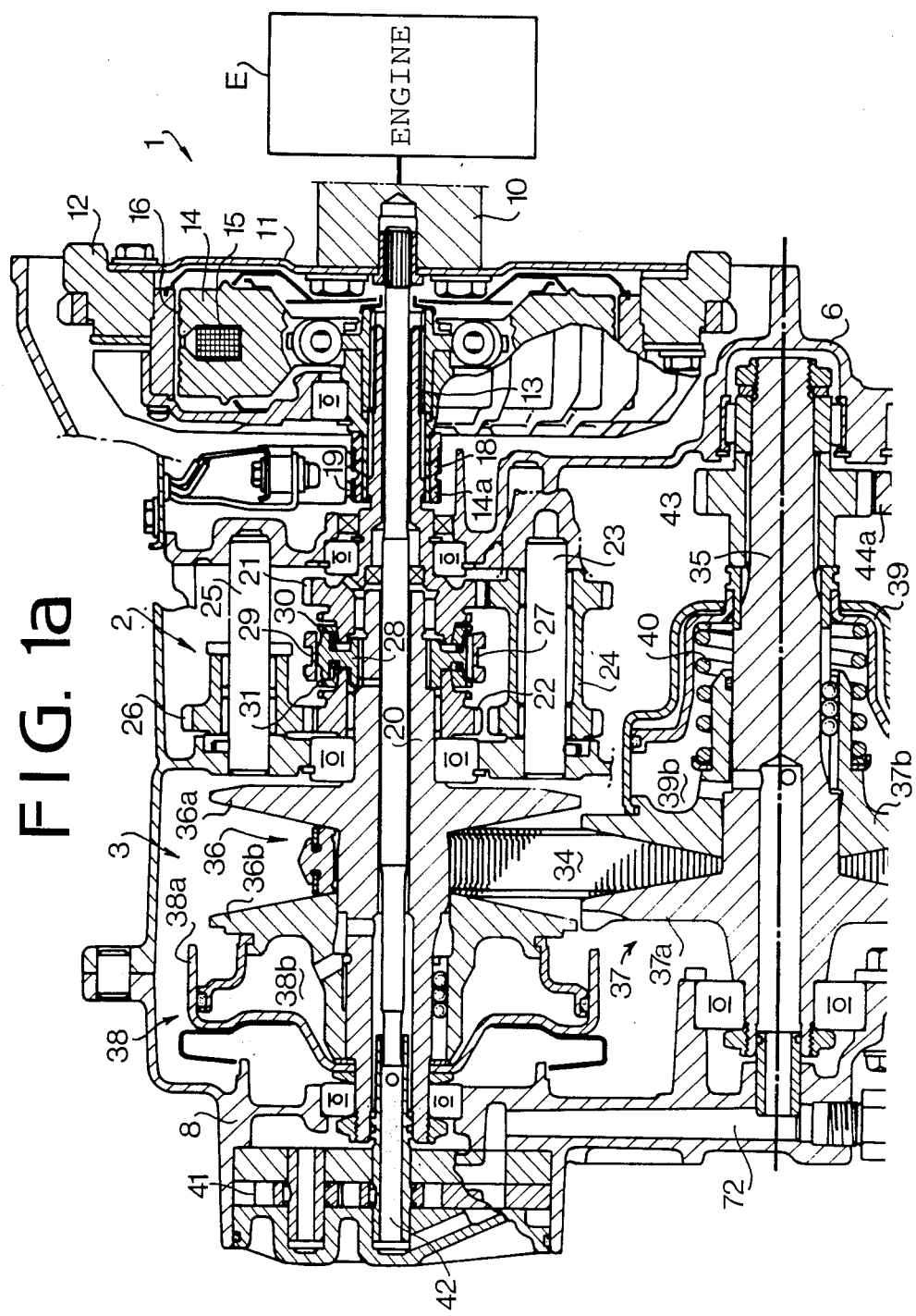

SYSTEM FOR CONTROLLING A TRANSFER CLUTCH OF A FOUR-WHEEL DRIVE VEHICLE

BACKGROUND OF THE INVENTION

The present invention relates to a control system for four-wheel drive vehicles, and more particularly to a system for controlling the torque capacity of a transfer clutch for four-wheel drive vehicles.

A four-wheel drive vehicle of the type in which a transfer clutch is provided for transmitting the output torque of a transmission to auxiliary drive wheels is known. In such a vehicle, a power transmission system can be converted from a two-wheel drive power transmission train to a four-wheel drive Cpower transmission train by engaging the transfer clutch. Meanwhile, when the vehicle negotiates corners, braking phenomenon called "tight corner braking" will occur at a sharp corner. Japanese Patent Application Laid Open No. 57-84227 discloses a system which is intended to eliminate the braking phenomenon. The disclosed system is provided with a fluid operated friction clutch as a transfer clutch, and a four-wheel drive power transmission system is converted to a two-wheel drive power transmission system by disengaging the clutch when a vehicle turns a sharp corner. However, when oil is discharged from the clutch, pressure of oil in the clutch decreases quickly. Accordingly, the torque transmitted by the clutch changes quickly and largely, which causes a great shock in the vehicle at the change of the power transmission train.

SUMMARY OF THE INVENTION

The object of the present invention is to provide a control system which gradually varies the clutch pressure, thereby reducing the shock which occurring at the change of the power transmission train.

The other objects and features of this invention will become apparently understood from the following description with reference to the accompanying drawings.

BRIEF DESCRIPTION OF DRAWINGS

FIGS. 1a to 1c show a sectional view of an infinitely variable belt-drive transmission to which the present invention is applied;

DETAILED DESCRIPTION OF THE PREFERRED EMBODIMENT

Figure 1B:
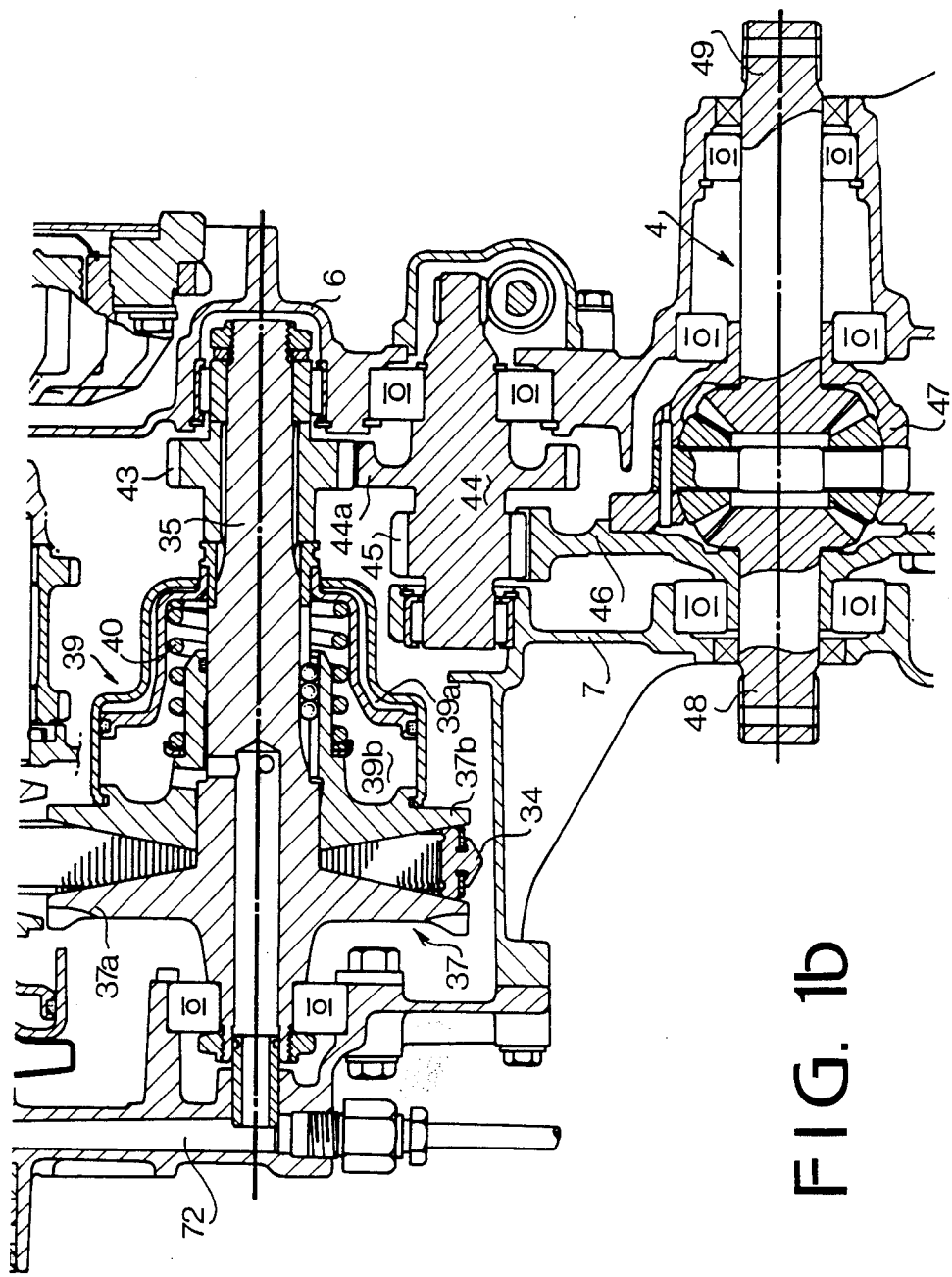
Figure 1C:
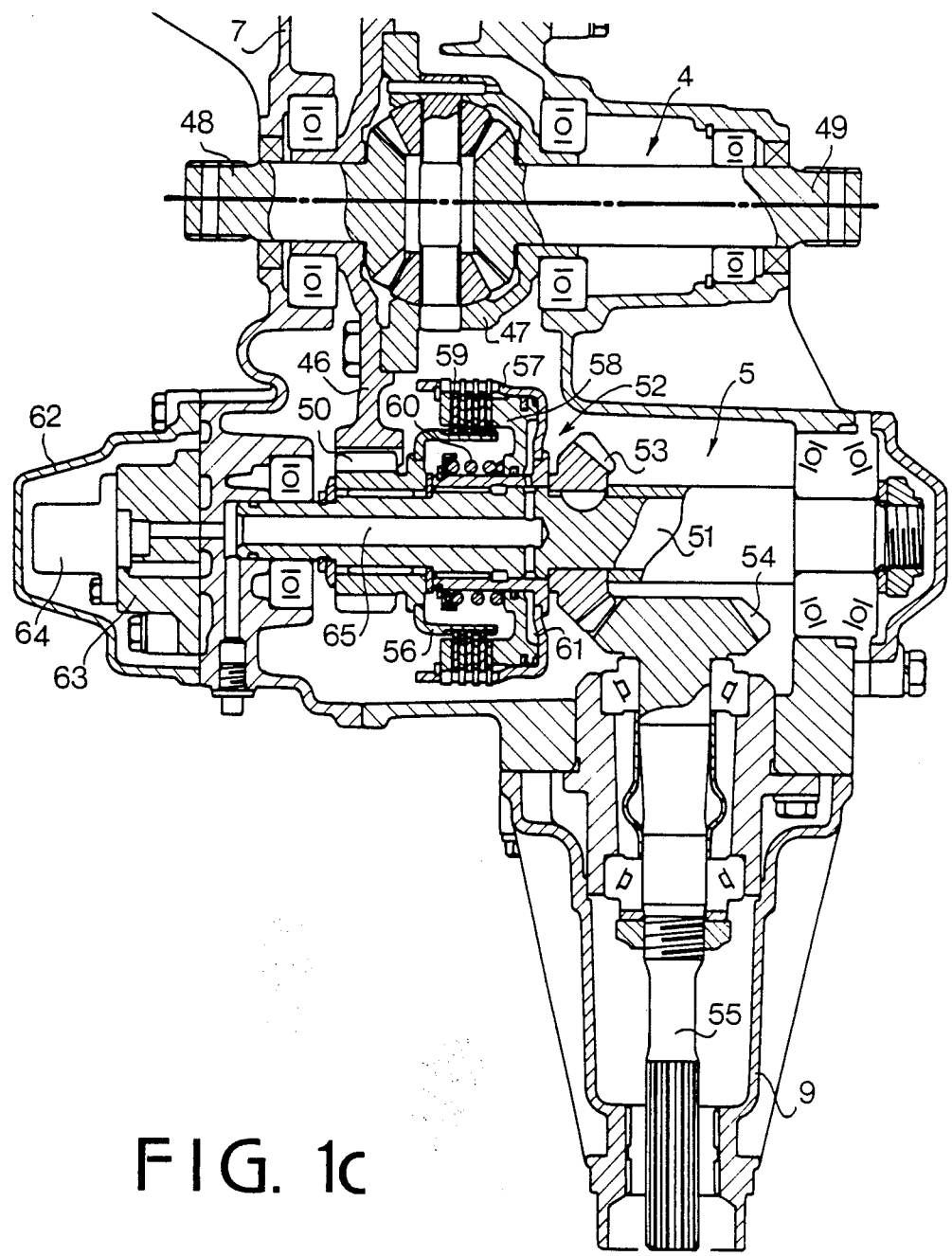

FIGS. 1a to 1c show a four-wheel drive power transmission system with an infinitely variable belt-drive automatic transmission for a motor vehicle, to which the present invention is applied. An engine E is transversely mounted on a motor vehicle at a front portion thereof. The power transmission system comprises an electromagnetic powder clutch 1, a selector device 2, an infinitely variable belt-drive transmission 3, a differential 4 for front wheels, and a transfer device 5. The electromagnetic powder clutch 1 is provided in a housing 6. The selector device 2, transmission 3, final differential 4 and transfer device 5 are provided in a main housing 7 and a side housing 8. An extension case 9 is secured to the main housing 7. A crankshaft 10 of the engine E is connected to an annular drive member 12 through a drive plate 11 of the electromagnetic powder clutch 1. The electromagnetic powder clutch 1 comprises a driven member 14, and a magnetizing coil 15 provided in the driven member 14. The driven member 14 has its outer periphery spaced from the inner periphery of the drive member 12 by a gap 16. Magnetic powder material is provided in the gap 16. The driven member 14 is secured to an input shaft 13 of the belt-drive transmission. A holder secured to the driven member 14 carries slip rings 18 which are electrically connected to the coil 15. The coil 15 is supplied through brushes 19 and the slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 2 is provided between the input shaft 13 and a main shaft 20. The main shaft 20 is cylindrical and is disposed coaxially with the input shaft 13. The selector device 2 comprises a drive gear 21 integral with the input shaft 13, reverse driven gear 22 rotatably mounted on the main shaft 20, and a synchronizer 27 mounted on the main shaft 20. The drive gear 21 meshes with one counter gear 24 rotatably mounted on a shaft 23. Another of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through the rings 30 or 31.

At a neutral position (N range) or a parking position (P range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D range). When the sleeve 29 is engaged with the gear 22, the input shaft 13 is connected to the main shaft 20 through the gears 21, 24, 26 and 22 to provide a reverse drive range position (R range).

The main shaft 20 has an axial passage in which an oil pump driving shaft 42 connected to crankshaft 10 is mounted. In the transmission 3, an output shaft 35 is provided in parallel with the main shaft 20. A drive pulley 36 and a driven pulley 37 are mounted on shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder 38a secured to the main shaft 20 to form a servo device 38 having a chamber 38b.

A fixed conical disc 37a of the driven pulley 37 is formed on the output shaft 35 opposite the movable disc 36b and a movable conical disc 37b is slidably mounted on the shaft 35 opposite disc 36a. The movable conical disc 37b also slides in a cylinder 39a secured to the output shaft 35 to form a servo device 39. A chamber 39b of the servo device 39 is communicated with the oil pump 41 through a passage 72. A spring 40 is provided to urge the movable conical disc 37b to the fixed conical disc 37a. A drive belt 34 engages with the drive pulley 36 and the driven pulley 37. The movable disc 36b has an area exposed to the line pressure which is larger than the corresponding area of the movable disc 37b.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of front driving wheels of the vehicle (not shown) through a differential 47.

The transfer device 5 comprises a transfer gear 50 engaged with the final gear 46 and rotatably mounted on a transfer shaft 51 which is transversely disposed and rotatably supported by bearings and a transfer clutch 52 in the form of a fluid operated multiple-disk friction clutch. The transfer clutch 52 comprises a hub 56 secured to the transfer gear 50, cylinder 57 secured to the shaft 51, a plurality of disks 59 provided between the hub 56 and the cylinder 57, and piston 58 for engaging the disks 59 with each other and piston chamber 61. A spring 60 is provided to urge the piston 58 to disengage the disks 59. Thus, the transfer clutch 52 operates to couple the gear 50 with the shaft 51, so that the rotation of the gear 50 is transferred to rear drive wheels of the vehicle (not shown) through shaft 51, bevel gear 53 secured to the shaft, bevel gear 54 engaged with the bevel gear 53 and rear drive shaft 55. The piston chamber 61 communicated through a passage 65 in the shaft 51 with a value assembly 63 which is provided with a solenoid 64.

Figure 2A:
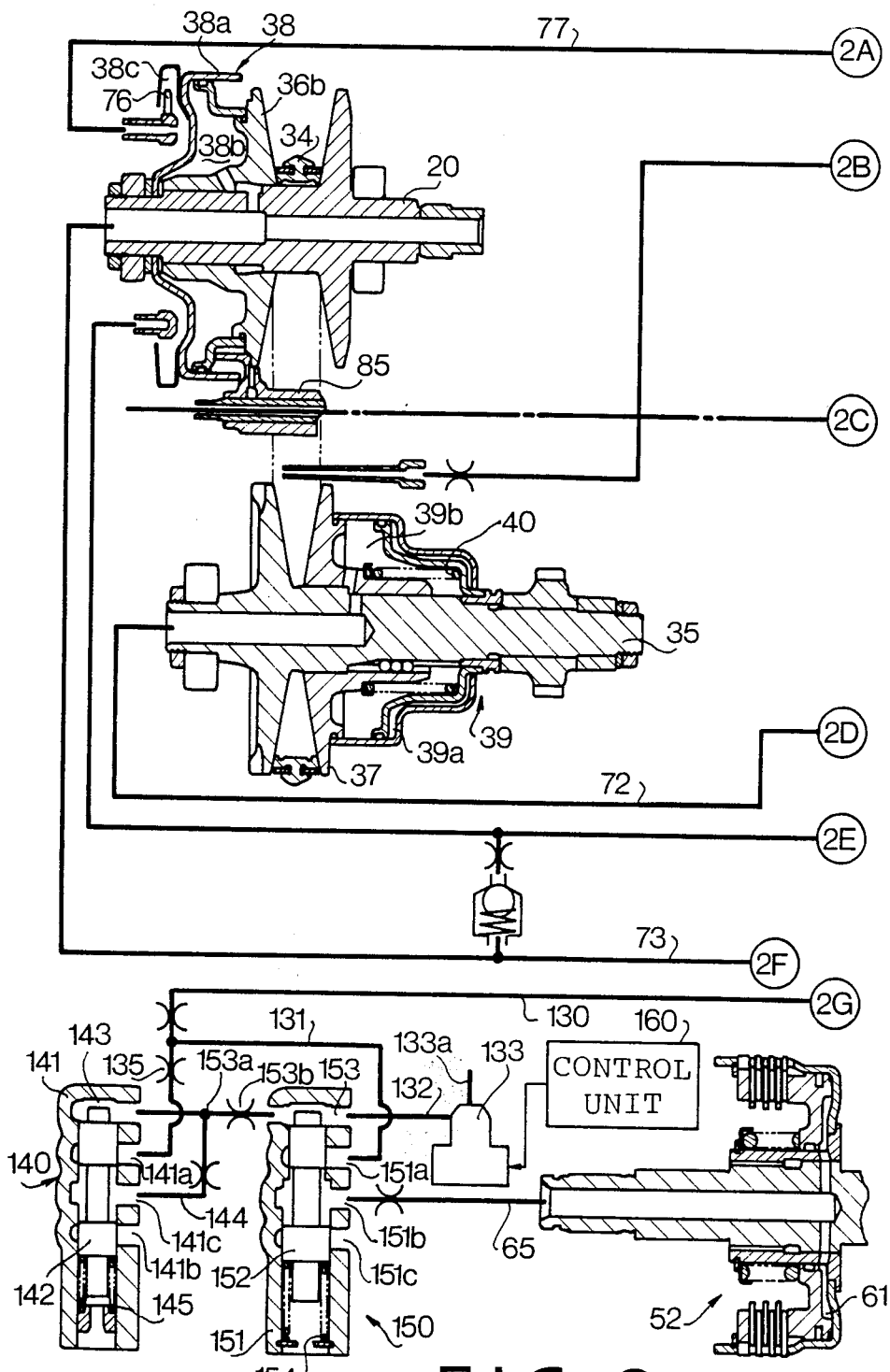
FIGS. 2a to 2c show a hydraulic control circuit according to the present invention.
Figure 2B:
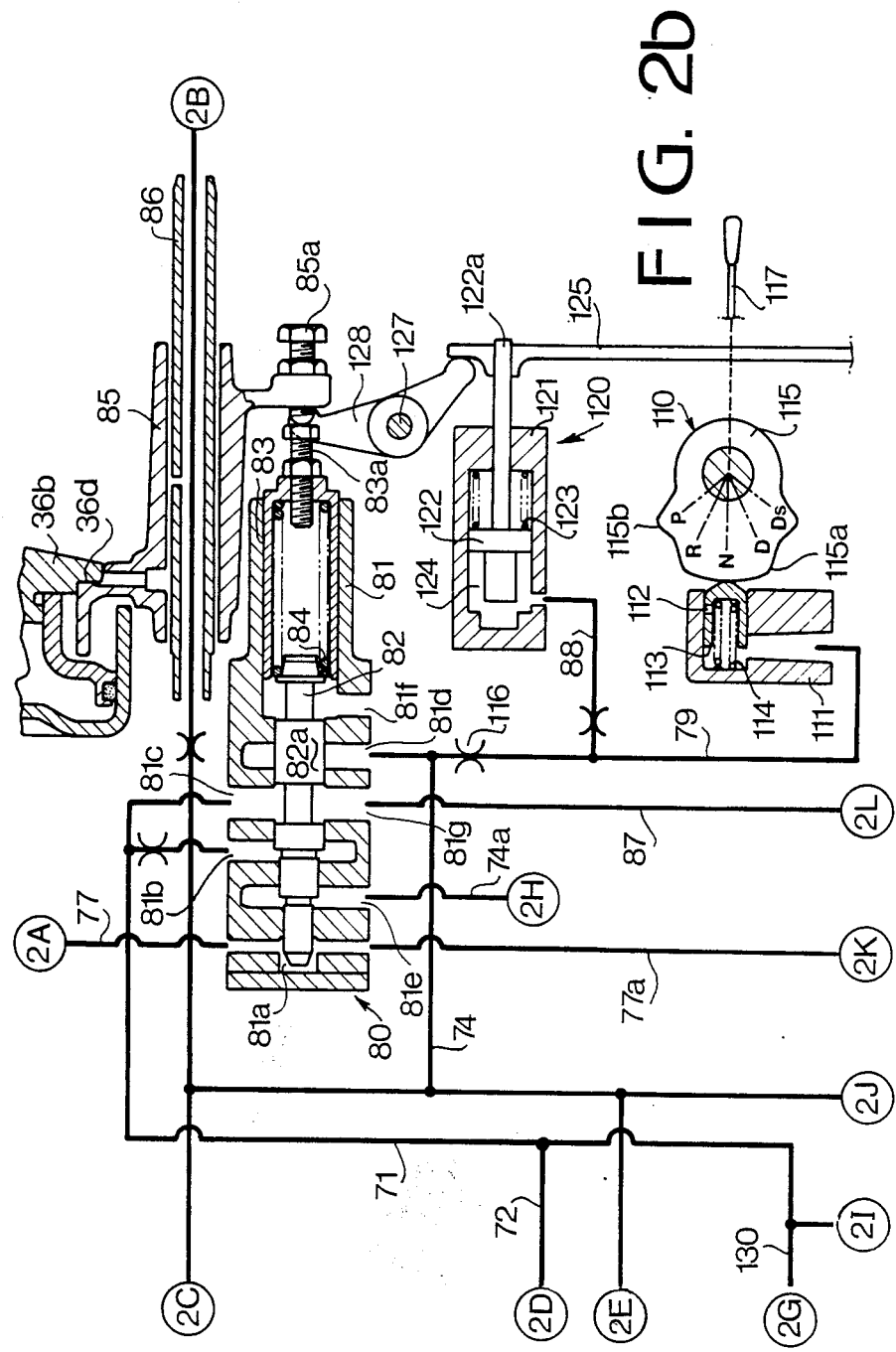
Figure 2C:
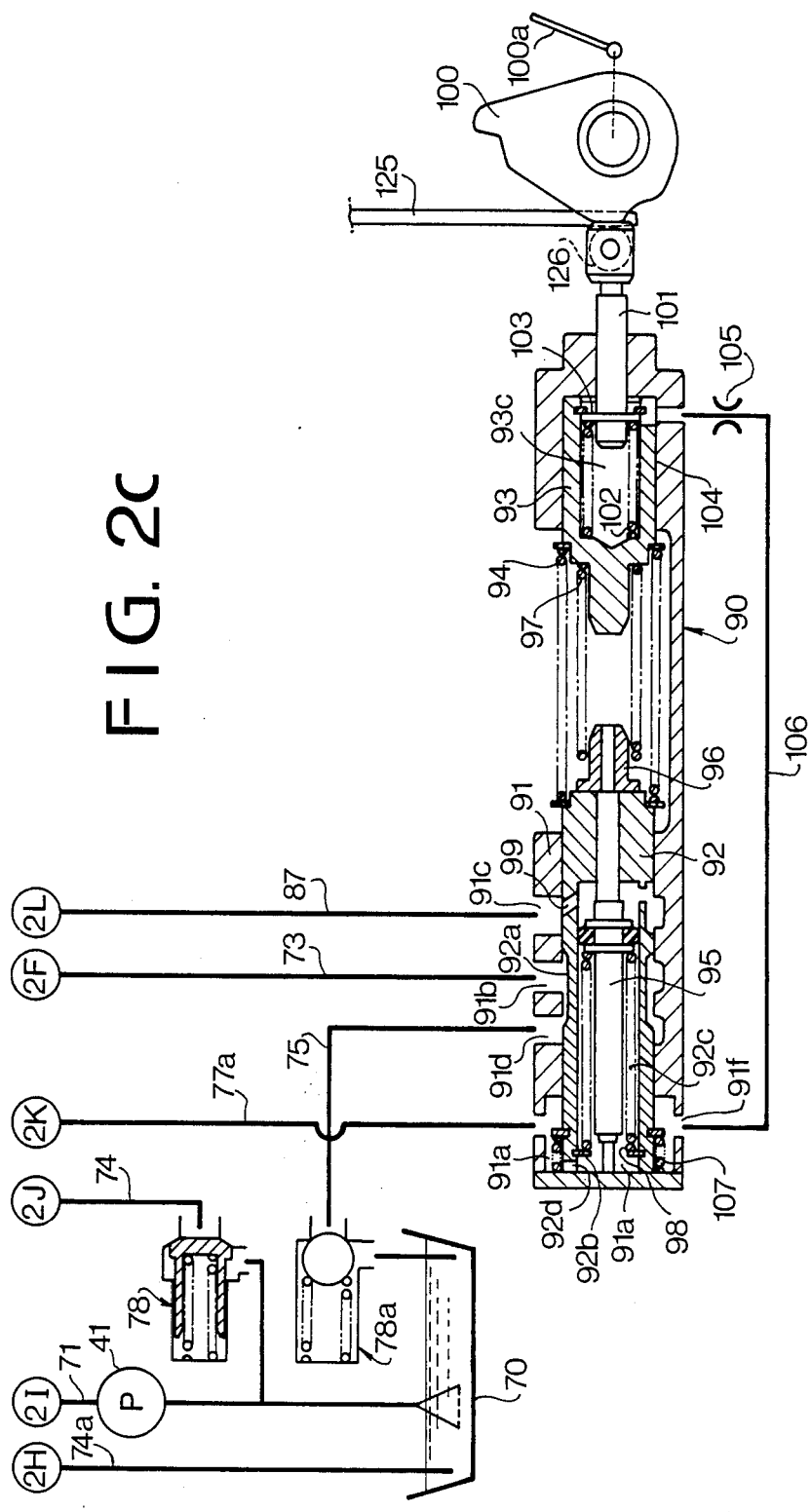

FIGS. 2a to 2c show a hydraulic circuit control according to the present invention. The circuit is provided with a pressure regulator valve 80 and a transmission ratio control valve 90.

The pressure regulator valve 80 comprises a valve body 81, spool 82, a spring 84 provided between a spring retainer 83 and one end of the spool 82 for urging the spool to the left.

The transmission ratio control valve 90 comprises a valve body 91, spool 92, operating plunger 93, and a spring 94 provided between the spool 92 and the plunger 93. Oil in an oil reservoir 70 is supplied to a port 81b of the pressure regulator valve 80 through a passage 71 by the pump 41. An oil passage 72 connected to the passage 71 is communicated with the driven pulley servo chamber 39b. The passage 71 is further communicated with the drive pulley servo chamber 38b through ports 81c and 81g of the regulator valve 70, the transmission ratio control valve 90 and a passage 73. Oil flows back from a port 81d of the regulator valve 80 to the inlet of the pump 41 through drain passages 74 and a check valve 78. A drain port 91d of the transmission ratio control valve 90 is communicated with the oil reservoir 70 through a passage 75 and a check valve 78a.

The drive pulley cylinder 38a has an annular inside groove 38c in which a rotation speed sensor 76 in the form of a pitot tube is provided for measuring the speed of the oil in the groove, that is the speed of the main shaft 20 which is proportional to the engine speed. The pitot pressure produced by the rotation speed sensor 76 is applied to end chambers 81a and 91a of the valves 80 and 90 through passages 77 and 77a.

The drain passage 74 for the pressure regulator valve 80 is communicated with a select position detecting valve 110 upstream of the check valve 78 through a passage 79 and further with an actuator 120 for the transmission ratio control valve 90 through a passage 88.

A sensor shoe 85 for detecting the actual transmission ratio is slidably mounted on a lubricating oil pipe 86 which is parallel with the axis of the spool 82. A bolt 85a secured to an end of the sensor shoe 85 engages with an end of a bolt 83a secured to the spring retainer 83, and the other end of the sensor shoe 85 engages with the outside periphery 36d of the movable disc 36b. Thus, the position of the movable disc 36b which means the transmission ratio during the operation is transmitted to the spool 82 through the spring 84. At the end of the valve body 81, opposite to the spring 84, the pitot pressure is applied to the end chamber 81a, and pump oil pressure is applied to chamber 81b through the passage 71. A chamber 81e which is provided between the chambers 81a and 81b for preventing the leakage of the oil dependent on the pitot pressure, is communicated with the oil reservoir 70 through drain passages 74a. The port 81c is communicated with the port 81d through a chamber formed on a land 82a of the spool 82 when the spool is shifted to the right, so that the line pressure can be regulated.

Thus, the spool 82 is applied with the pitot pressure and pump oil pressure so as to be moved in the direction to open the port 81d, whereas the elastic force of the spring corresponding to the transmission ratio detected by the sensor shoe 85 urges the spool 82 in the direction to close the port 81d. Accordingly, high line pressure is generated at the port 81g at a low engine speed with a large transmission ratio. The sensor shoe 85 is moved to the right in FIG. 2b as the transmission ratio decreases, reducing the force of the spring 84 to lower the line pressure. The line pressure is transmitted to the belt 34 at a proper force dependent on the transmission ratio so as not to cause the belt to slip on the pulleys.

The transmission ratio control valve 90 further comprises an annular groove 92a formed on the spool 92 so as to communicate the ports 91b with 91c or port 91d for supplying or discharging line pressure to or from the drive pulley servo chamber 38b in dependency of the position of the spool 92. A regulator spring 97 is provided between the operating plunger 93 and a retainer 96 securely mounted on a projecting end of a regulator plunger 95 which is slidably provided in an axial cavity 92c in the spool 92. A spring 98 is provided between a flange of the plunger 95 and a retainer 92b of the spool 92. The force of the regulator spring 97 is determined by the projecting extent of the plunger 95 from the spool 92 and the position of the plunger 95 is dependent on the line pressure at the port 91c which is supplied to the inside of the spool 92 through a small aperture 99.

The plunger 93 is slidably mounted in the valve body 91 and has an axial cavity 93c. A rod 101 is axially slidably mounted in the valve body 91, and a flange 103 of the rod 101 is slidably engaged with the wall of the cavity 93c. A small spring 102 is provided between the flange 103 and the plunger 93. The pitot pressure is applied to the chamber 91a through a port 92d. The cavity 93c is supplied with the pitot pressure through a port 91f and a pasasge 106 having an orifice 105. A spring 107 is provided between an end of the spool 92 and the valve body 91 to adjust the load on the spring 102. An end of the rod 101 engages wtih a cam 100 which is operatively connected to an accelerator pedal 100a of the vehicle so as to be rotted in dependency on the depression of the pedal.

When the spool 92 is moved by the pitot pressure to communicate the port 91c with port 91b, the line pressure is applied to the servo chamber 38b of the drive pulley 36 to upshift the transmission. On the other hand, when the port 91b communicates with the port 91d, the chamber 38b is drained to downshift the transmission.

The select position detecting valve 110 comprises a valve body 111, a valve 113 having a drain aperture 112 which is slidably mounted in the valve body 111, a spring 114 for urging the valve 113 against a cam 115 which rotates according to the postion of a selector lever 117. The cam 115 has a lobe 115a corresponding to D, N, R range positions, and lobes 115b formed in the both sides of the lobe 115a, corresponding to P and Ds range positions. At the D, N, R range positions, the lobe 115a pushes the valve 113 in the direction to close the drain aperture 112, so that actuating oil pressure is built up. At the P and Ds range positions, the valve 113 moves outwardly to open the drain aperture 112, so that the oil pressure in the passages 74 and 79 is lowered. At that time the oil pressure decreases gradually, because of an orifice 116 provided in the oil passage 79. The oil pressure is applied to the actuator 120.

The actuator 120 comprises a cylinder 121, a piston 122 which is slidably mounted in the cylinder 121, and a spring 123 for urging the piston 122 in a direction toward a piston chamber 124 to which actuating oil pressure is applied through a passage 88. Further, a connecting rod 125 is secured to an outer end of a rod 122a which is connected to the piston 122 and is engageable with a pin 126 on the rod 101 of the transmission ratio control valve 90. At the P range or Ds range, the since no acting oil pressure exists, piston 122 presses the rod 101 to the left in FIG. 2c, controlling the transmission zone to the side of high engine revolution. Thus, the releasing of the accelerator pedal at Ds range causes the downshifting of the transmission, so that third engine braking effects. Further, a correction lever 128 rotatably supported by a pin 127 is provided between the sensor shoe 85 and the rod 125, in order to correct the charcteristics in the Ds range. One end of the lever 128 engages the with the rod 125 only when piston 122 of the actuator 120 moves to the left. Under such a condition, when the transmission is downshifted to shift the disk 36b to the left, the sensor shoe 85 engages with the end of the lever 128 to rotate it. Thus, the rod 125 and piston 122 are moved toward the right as the transmission ratio increases, and at the maximum transmission ratio, the piston 122 is returned to the right end position.

A control system for the transfer clutch 52 is explained hereinafter. The control system comprises a pressure regulator valve 140, a transfer control valve 150, a solenoid operated valve 133, and a control unit 160. The pressure regulator valve 140 comprises a valve body 141, spool 142, end chamber 143, spring 145 for urging the spool to the end chamber 143. A port 141a is commuinated with the pump 41 through a passage 130 having an orifice 135. The spool 142 is shifted by the difference between forces exerted on both ends thereof, one of which is the pressure of oil in the chamber 143 and the other is the force exerted by the spring 145. When the spool 142 is downwardly shifted, a drain port 141b opens, thereby draining the oil in the chamber 143 through a passage 144 and ports 141c and 141b. When the spool 142 is upwardly shifted, the port 141a opens, so that oil is supplied to the chamber 143 through passage 130, ports 141a and 141c, and passage 144. Thus, the pressure of oil in the chamber 143 is kept constant.

Designating the pressure receiving area of the spool 142 in the chamber 143 by S, regulator pressure of oil in the chamber 143 by Pr and the force exerted by spring 145 by F, $$Pr \cdot S = F$$

$$Pr = F/S$$

Accordingly, the pressure Pr can be kept constant.

The transfer control valve 150 comprises a valve body 151, a spool 152 having two pistons which are different in diameter, an end chamber 153 communicated with the chamber 143 through a passage 153a having an orifice 153b, a spring 154, a port 151a communicated with the passage 130 through a passage 131, a port 151b communiated with the piston chamber 61 of the transfer clutch 52 through passage 65, and drain port 151c. The chamber 153 is communicated with the solenoid operated valve 133 through a passage 132 so as to provide control pressure in chamber 153. The control pressure Pc and clutch pressure $P_T$ of oil in the chamber 61 urge the spool 152 downwardly against the spring 154. When the spool moves downwardly, port 151a is closed and drain port 151c is opened, so that the clutch pressure $P_T$ decreases. To the contrary, when the spool 152 is upwardly shifted, port 151a opens to increase the clutch pressure $P_T$.

Thus equation for the control pressure Pc, clutch pressure $P_T$, the force F exerted by the spring 154, the area S1 of the large diameter piston and the area S2 of the small diameter piston of the spool 152, is $$Pc \cdot S2 + P_T(S1 - S2) = F$$

Therefore $$P_T = (F - Pc \cdot S2)/(S1 - S2)$$

Since S1, S2 and F are constant, the clutch pressure $P_T$ is inversely proportional to the control pressure $P_c$. The solenoid operated valve 133 is operated by a pulse train applied from the control unit 160. The control pressure Pc is controlled by changing the duty ratio of the pulses in the pulse train.

Figure 4A:
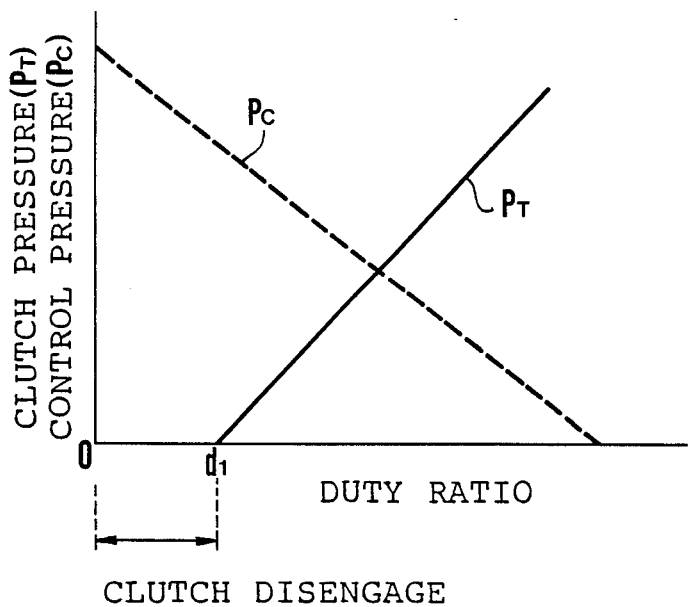
FIG. 4a is a graph showing a relationship between clutch pressure, control pressure and duty ratio.

FIG. 4a shows the relationship between the clutch pressure $P_T$, control pressure Pc and duty ratio. When the duty ratio is at 0%, the solenoid operated valve 133 does not drain through the drain passage 133a. Accordingly, the control pressure is at the highest value which is equal to the regulator pressure Pr. As the duty ratio increases, the control pressure Pc reduces as shown by the dashed line. On the other hand, the clutch pressure $P_T$ is zero in a range smaller than a small duty ratio d1 and increasing with increase of the duty ratio from the duty ratio d1.

Figure 3A:
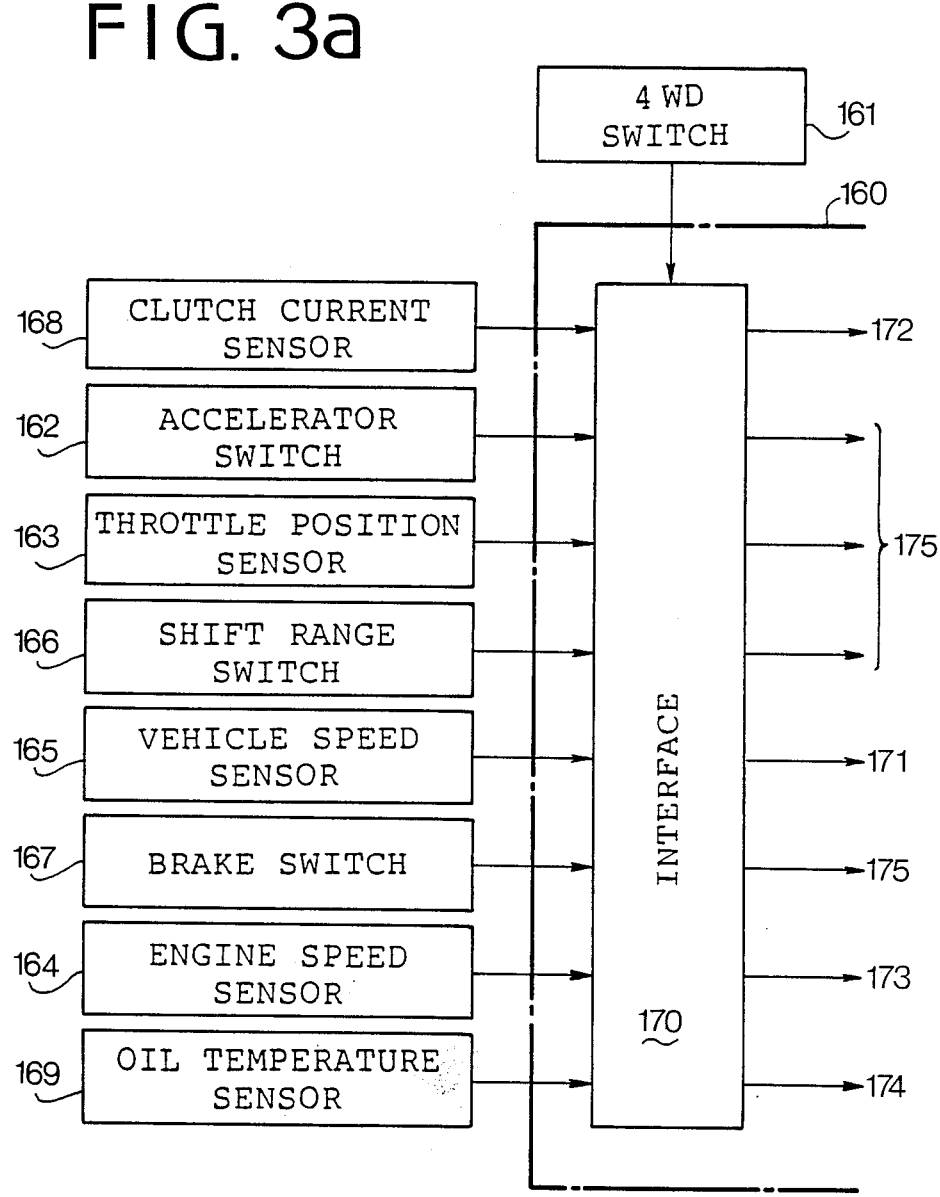
FIGS. 3a to 3c show a block diagram of a control system of the present invention.
Figure 3B:
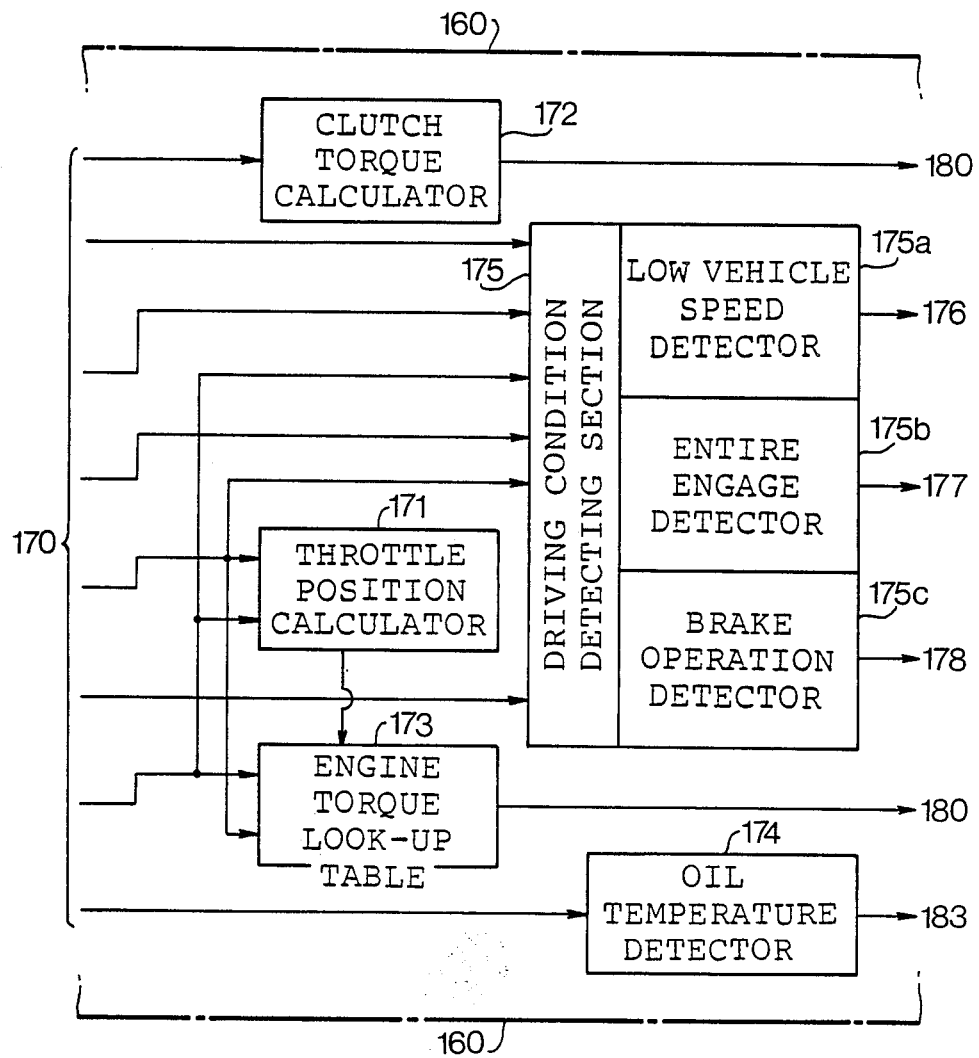
Figure 3C:
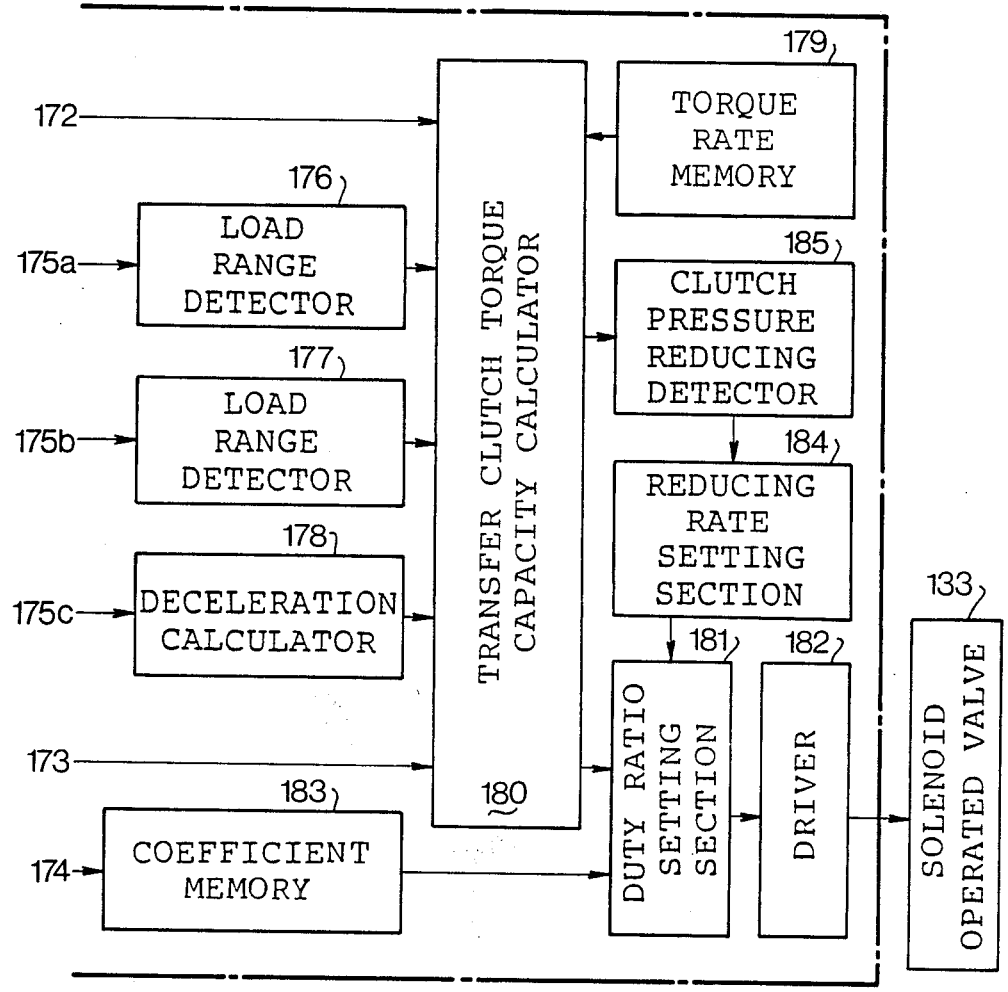

Referring to FIGS. 3a to 3c showing a block diagram of a system according to the present invention, the system has a 4WD switch 161 for detecting the four-wheel drive state, accelerator switch 162 for the detection of the release of the accelerator pedal 100a, throttle position (switch) 163 for detecting whether the engine load is in a light load range or a heavy load range, engine speed sensor 164, vehicle speed sensor 165 for detecting vehicle speed dependent on the speed of the front wheels, shift range switch 166 for detecting D, Ds and R ranges, brake switch 167 for sensing the depression of a brake pedal, clutch current sensor 168 of the clutch 1, and oil temperature sensor 169. When the 4WD switch 161 is closed, output signals of the switches and sensors 162–169 are fed to the control unit 160 through an interface 170.

Figure 4B:
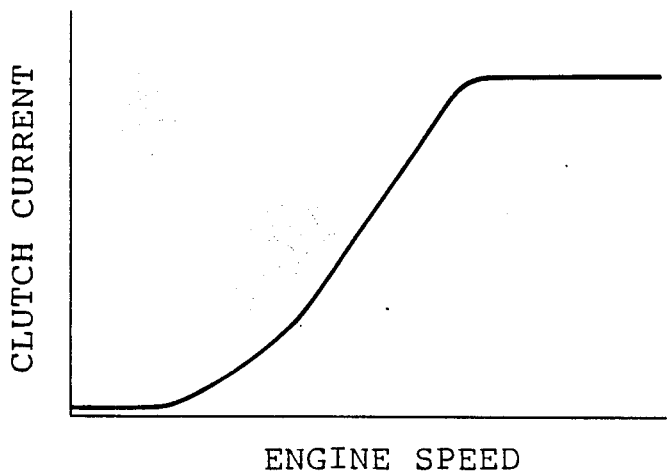
FIG. 4b shows a characteristic of an electromagnetic valve.
Figure 4C:
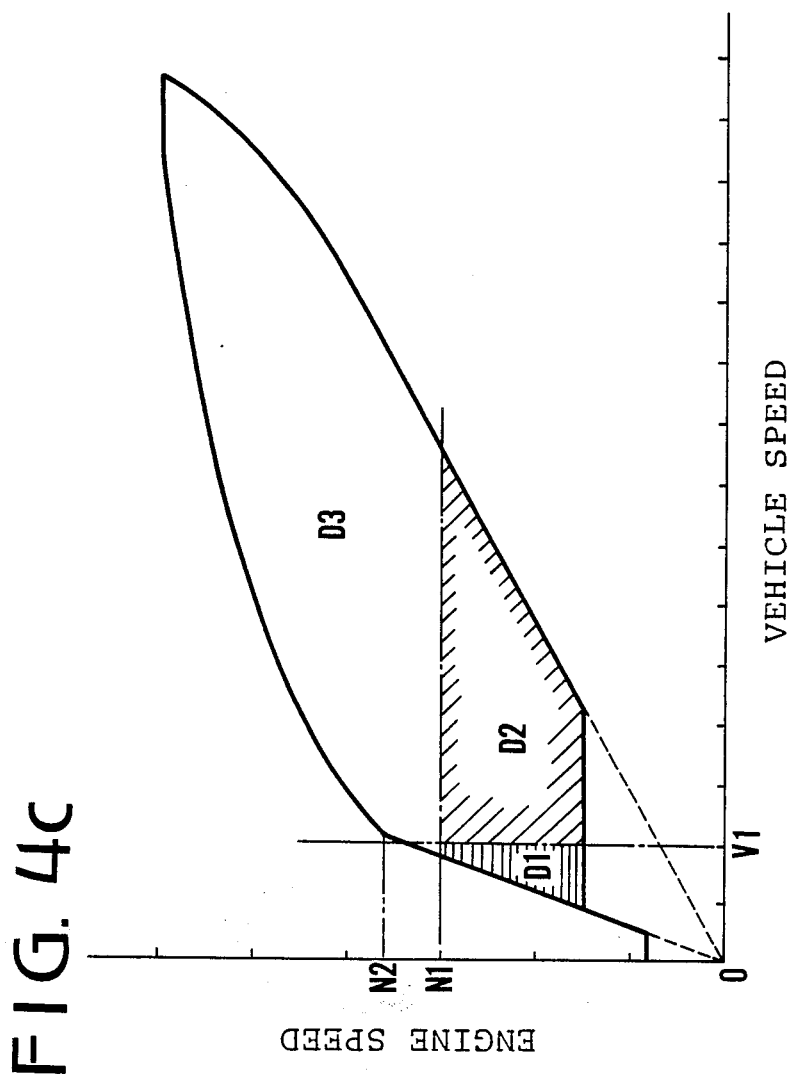
FIG. 4c shows a relationship between vehicle speed and engine speed.

In the control unit 160, a throttle position and transmission ratio calculator 171 calculates the transmission ratio based on engine speed and vehicle speed and the position of a throttle valve of the engine is taken from a look-up table. The relationship between vehicle speed and engine speed of a vehicle having the infinitely variable belt-drive transmission has a pattern in accordance with load as shown in FIG. 4c. Accordingly a look-up table for the throttle valve position can be provided from the graph of FIG. 4c. In a low vehicle speed range $D_1$ lower than a low speed $V_1$, the clutch 1 is in a partial engage state in accordance with small clutch current shown in FIG. 4b. A clutch torque calculator 172 calculates the torque capacity, that is the transmitted torque in the partial engage state of the clutch 1, based on the clutch current. An engine torque look-up table 173 provides engine torque from the throttle position and engine speed. An oil temperature detector 174 detects high temperature higher than a set value.

A driving condition detecting section 175 comprises a low vehicle speed detector 175a for detecting vehicle speed lower than the speed $V_1$, clutch entire engage detector 175b at high speed higher than $V_1$, and brake operation detector 175c. The output signal of the low vehicle speed detector 175a is applied to a load range detector 176 which detects whether the engine is in a light load range or a heavy load range in accordance with output signals of the accelerator switch 162 and throttle position sensor 163, and further detects the position of the shift lever 117 at each load range in accordance with the output signal of the shift range switch 166. The output signal of the detector 175b is applied to a load range detector 177 which detects a light load range $D_2$(FIG. 4c) below a predetermined engine speed $N_1$ and a heavy load range $D_3$ above speed $N_1$. The engine speed $N_1$ is set to a speed lower than an engine speed $N_2$ from which the upshifting of the transmission starts. The output signal of the brake operation detector 175c is applied to a deceleration calculator 178 for producing a deceleration signal. The output signal of each section is applied to a transfer clutch torque capacity calculator 180. A clutch torque rate (percentage) memory 179 supplies torque rates to the torque capacity calculator 180 so as to provide a proper torque capacity.

In a low vehicle speed range below a set speed $V_1$ in partial engagement of the clutch 1, the torque capacity of the transfer clutch 52 is determined by a predetermined percentage of the transmitting torque of the clutch 1. When the clutch 1 is entirely engaged above the speed $V_1$, the torque capacity is determined by other percentages with respect to the engine torque.

A duty ratio setting section 181 produces a duty ratio signal dependent on the output of the torque capacity calculator 180. The duty ratio signal is corrected by a coefficient from a coefficient memory 183 when oil temperature is higher than a set temperature $t_1$. The duty ratio signal is applied to the solenoid operated valve 133 through a driver 182.

One of the outputs of the transfer clutch torque capacity calculator 180 is connected to a clutch pressure (torque capacity) reducing signal detector 185. The calculator 180 applies a signal to the clutch pressure reducing signal detector 185, time whereby the calculator supplies a clutch pressure reducing signal to the duty ratio setting section 181 through the section 184, for example at opening the 4WD switch 161 or changing driving ranges. The output of the detector 185 is applied to a clutch pressure reduction rate setting section 184 the output of which is applied to the duty ratio setting section 181. In response to the output of the section 184, the section 181 produces an output for gradually decreasing the duty ratio.

The operation of the system is described hereinafter. While the vehicle is at a stop, the driven pulley servo chamber 39b is supplied with the line pressure adjusted by the pressure regulator valve 80 through the passages 71, 72, and the drive pulley servo chamber 38b is drained, since the spool 92 is at the left end position by the spring 94. Thus, the driving belt 34 engages with the driven pulley 37 at a maximum running diameter to provide the largest transmission ratio (low speed stage).

On the other hand, the selector lever 117 is at the N range position to select the N range, so that the drain aperture 112 of the select position detecting valve 110 is closed. When the D range is selected, the input shaft 13 and the main shaft 20 are connected to each other in the selector device 2 by the selector lever 117. When the acceleration pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to axles of the driving wheels. Thus, the vehicle is started.

When the pitot pressure rises, the spool 92 is shifted to the left, so that the line pressure is applied to the servo chamber 38b to move the disc 36b to the left. Thus, upshifting of the transmission starts.

When the 4WD switch 161 is off, the control unit 160 produce a two-wheel drive signal, so that the duty ratio setting section 181 produces a duty ratio signal for providing pulses of zero percent. Accordingly, the solenoid operated valve 133 is closed, thereby increasing the control pressure $P_c$ in the chamber 153 of the transfer control valve 150 to a maximum value. As a result, the spool 152 is downwardly shifted to close the port 151a, which causes the clutch pressure $P_T$ to become zero to disengage the transfer clutch 52. Thus, two-wheel drive transmission is established.

When the 4WD switch 161 is closed, signals from switches and sensors are applied to the control unit 160 through the interface 170. At a low vehicle speed below $V_1$, including the starting of the vehicle, the torque capacity of the electromagnetic clutch 1 is calculated at the calculator 172. Thus, the partial engagement of clutch 1 is detected by the value of the torque capacity. If the brake switch 167 is off, the load range detector 176 determines load range of the engine. When the accelerator pedal is released and the accelerator switch 162 is off, the torque capacity calculator 180 produces an output signal representing a minimum duty ratio (a minimum percentage (10%) of engine torque at full throttle). Accordingly, torque capacity of the transfer clutch 52 is fixed to ten percent of the engine torque at full throttle. Thus, a small torque is transmitted to the rear wheels of the vehicle at a low vehicle speed, so that the tight braking phenomenon can be prevented with slipping of the transfer clutch.

When the accelerator switch 162 is closed, and the throttle position switch 163 is off because of a light load on the engine, the torque capacity calculator 180 produces a signal for a small percent of the clutch torque transmitted by the clutch 1. Accordingly, the torque capacity of the transfer clutch increases. Further, the torque capacity of the transfer clutch increases with an increase of the torque transmitted by the clutch 1. In such a state, the transfer clutch still slips so as to prevent the tight corner braking.

When the throttle position switch 163 is on at a heavy load, the calculator 180 produces a signal for a large percent. Thus, the torque capacity of the transfer clutch 52 increases.

Figure 6:
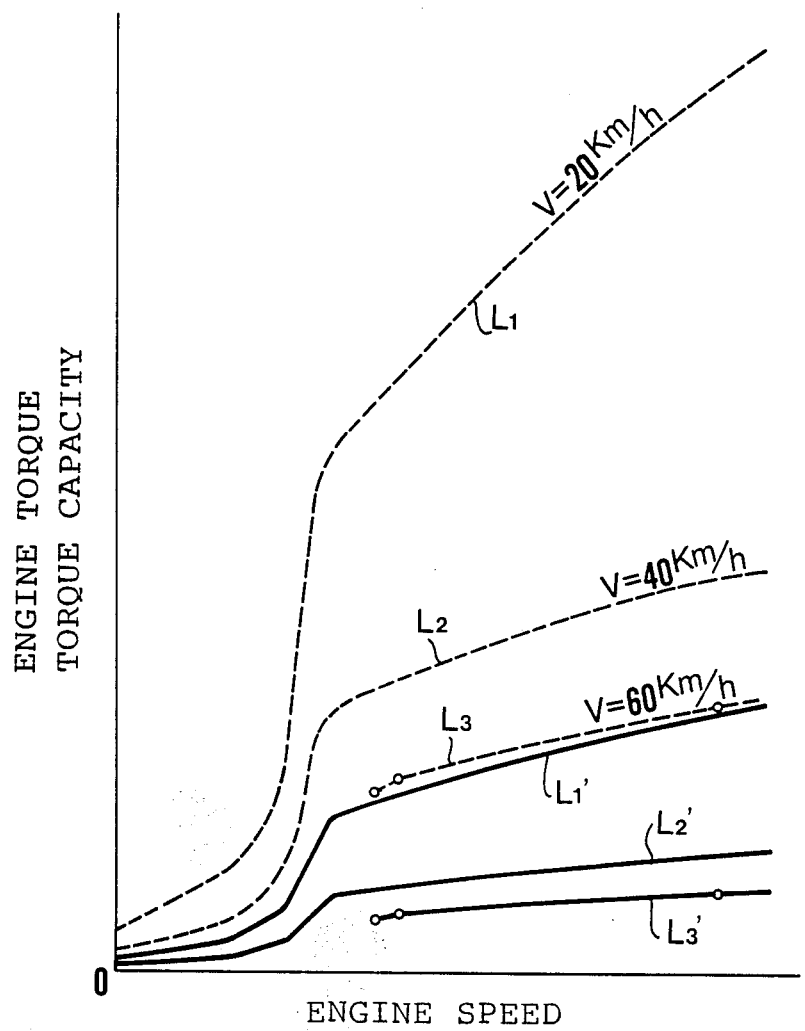
FIG. 6 a relationship between engine speed and torque capacity of a transfer clutch in a low vehicle speed range.

When the vehicle speed is higher than the speed $V_1$ while the clutch 1 is entirely engaged, the engine torque look-up table 173 provides engine torques dependent on vehicle speeds, for example as shown by lines $L_1$, $L_2$, and $L_3$ in FIG. 6. In response to the output signal of clutch entire engage detector 175b, the range detector 177 detects whether the drive condition is in the range $D_2$ or $D_3$.

In the range $D_2$, the calculator 180 produces a signal for thirty percent of engine torque ($L_1$, $L_2$, $L_3$). Accordingly, the torque capacity of the transfer clutch 52 is set as shown by lines $L_1'$, $L_2'$ and $L_3'$. Thus, thirty percent of the engine torque is transmitted to the rear wheels to allow the transfer clutch to slip at sharp curves.

Figure 5A:
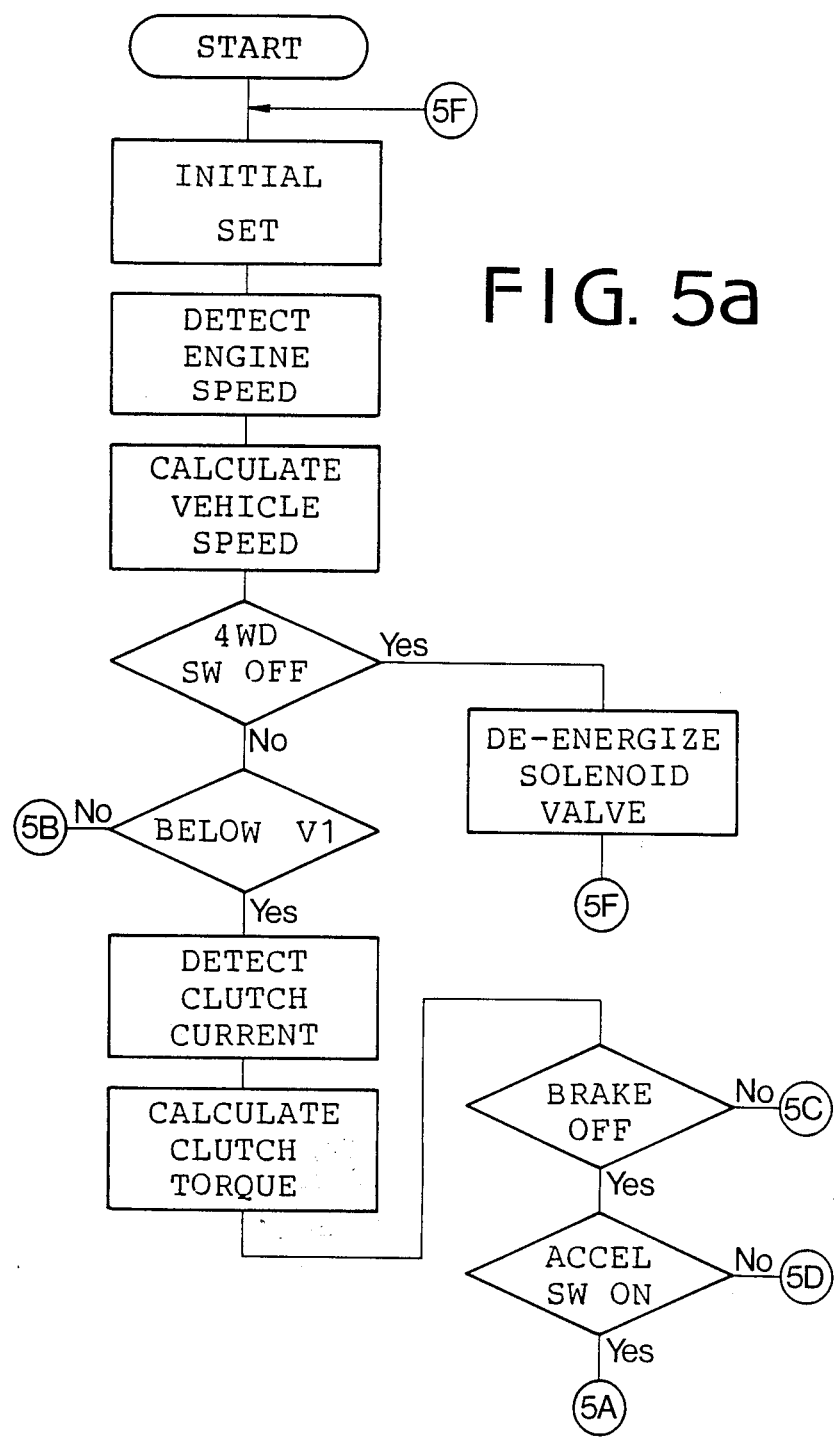
FIGS. 5a to 5c show the a flowchart showing main operation of the system.
Figure 5B:
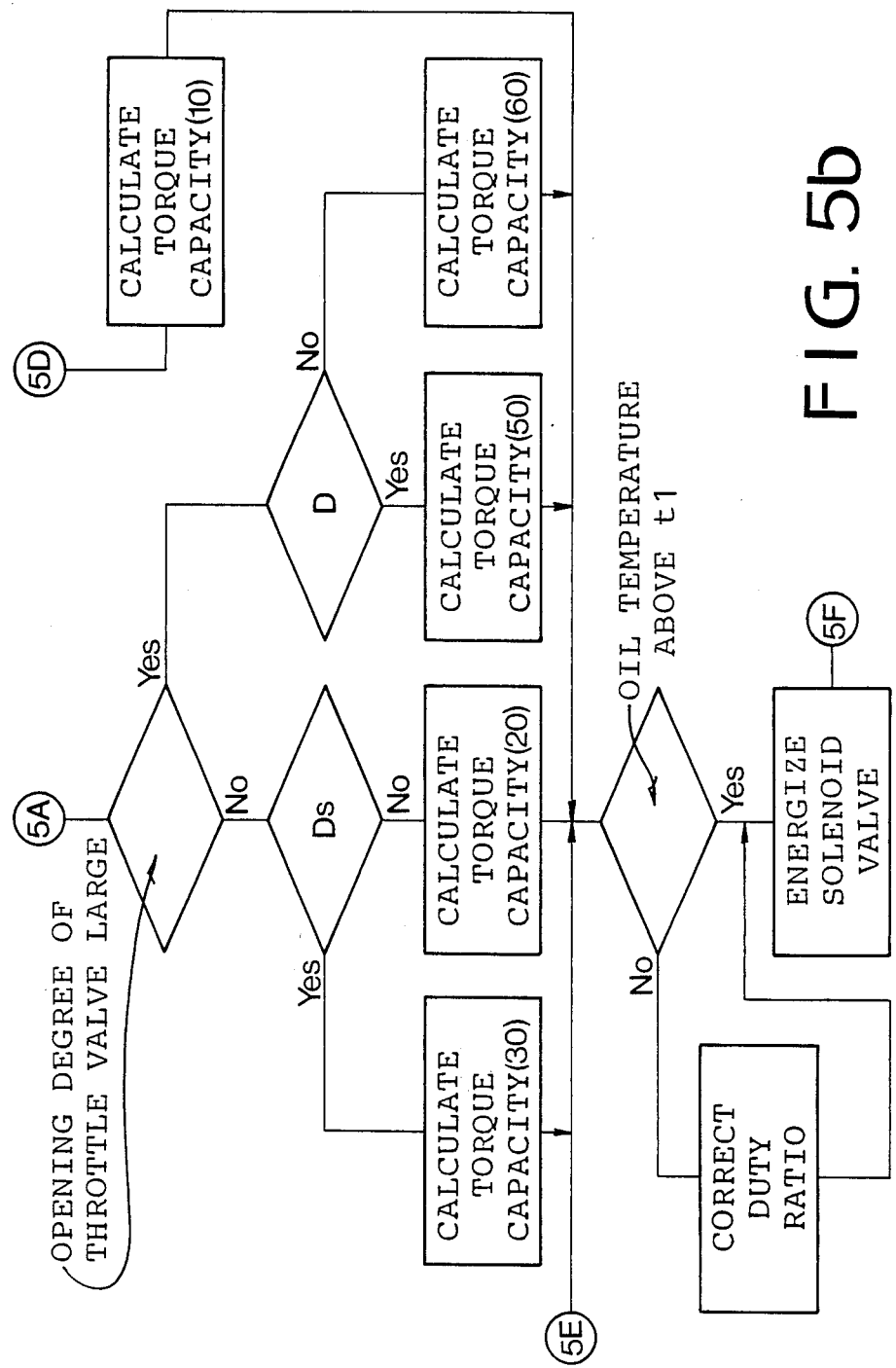
Figure 5C:
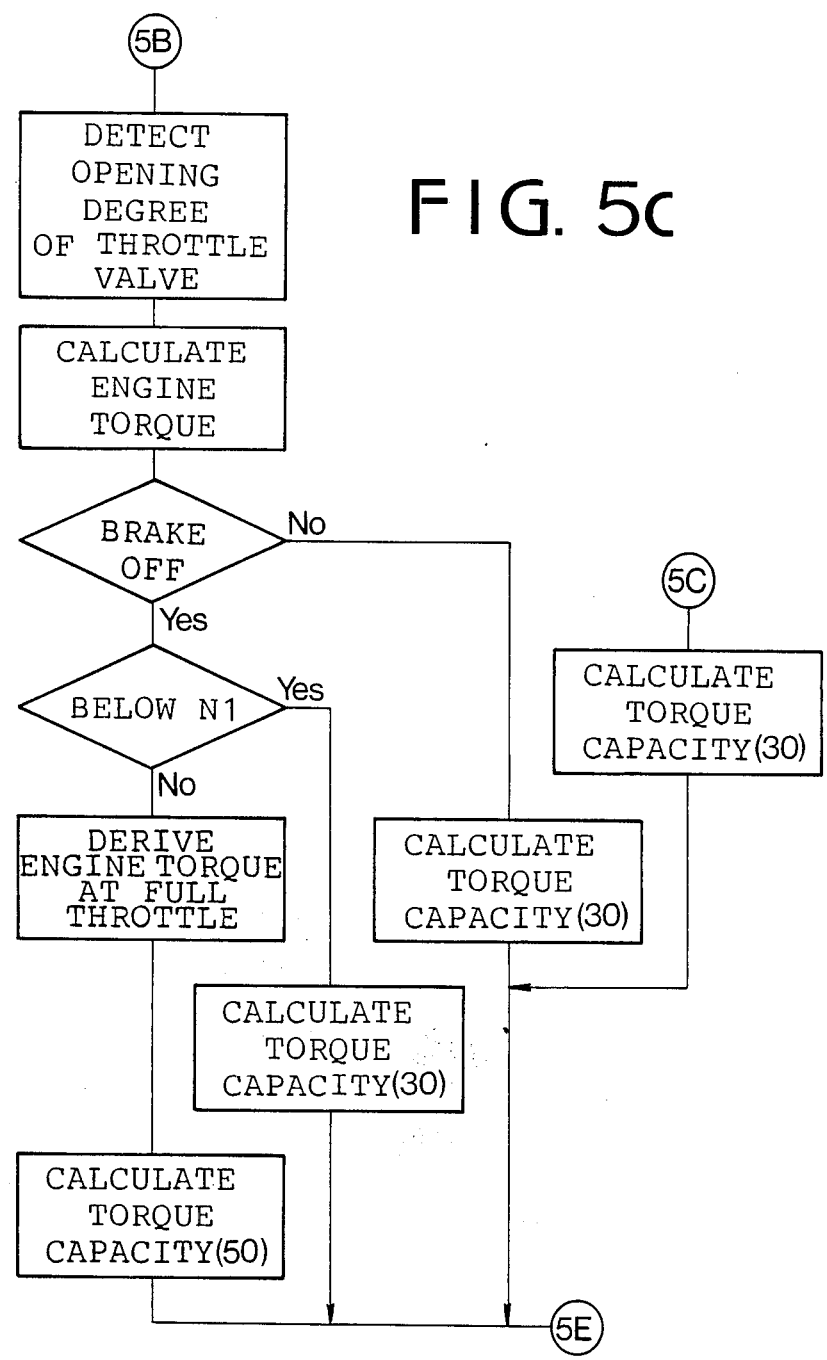

In the range $D_3$, the torque rate is set to fifty percent. In such a case, the engine torque at full throttle is used for obtaining the torque capacity of the transfer clutch. FIGS. 5a to 5c show the above-described operation.

Figure 7:
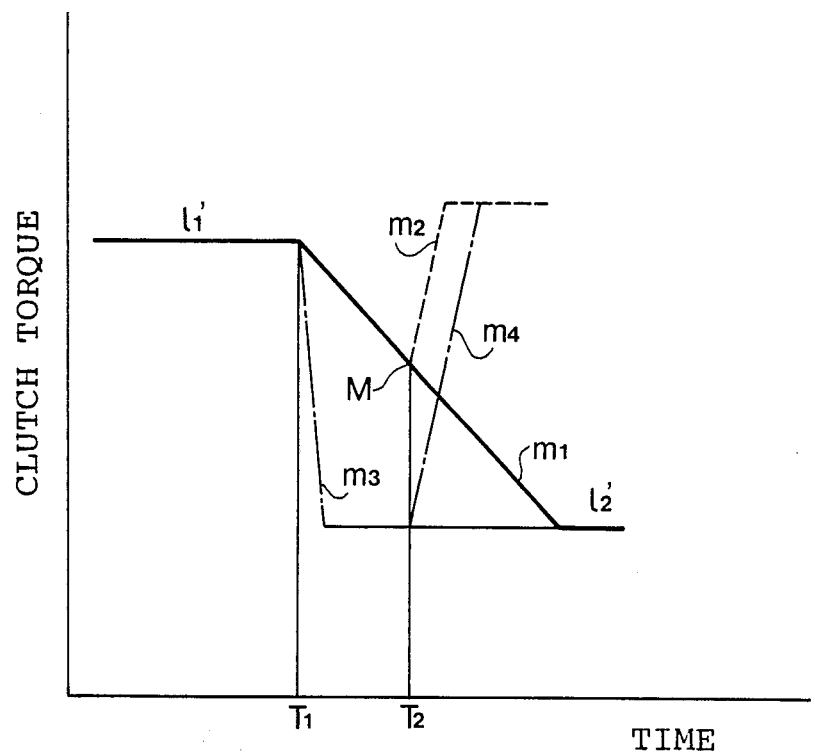
FIG. 7 shows characteristics of a transfer clutch in the system of the present invention compared to prior art.

As shown in FIG. 6, when the engine torque decreases, the torque capacity of the transfer clutch decreases. For example, in the case that the torque capacity of the transfer clutch 52 reduces from line $l_1'$ to $l_2'$ at a time $T_1$ (FIG. 7), the reduction is detected by the clutch pressure reducing signal detector 185 and the clutch pressure reduction rate setting section 184 produces an output signal. Thus, the duty ratio setting section 181 operates to gradually reduce the duty ratio. Thus, the control pressure $P_c$ is gradualy increased, so that clutch pressure $P_T$ and thus the clutch torque is gradually reduced as shown by a line $m_1$ in FIG. 7.

When the accelerator pedal is depressed at a time $T_2$, the clutch pressure $P_T$ increases from a point M as shown by a line $m_2$. Thus, the torque capacity rapidly increases to a set value dependent on the driving conditions. In the conventional system with the torque capacity change from $l_1$ to $l_2l$ at time $T_i$ and acceleration pedal depresion at time $T_2$. as described above, the clutch pressure varies as shown by a dashed lines $m_3$ and $m_4$. Accordingly, the clutch pressure suddenly reduces and a longer time elapses before the clutch pressure reaches the set value.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a four-wheel drive vehicle having an engine, a transmission, means comprising a main clutch for transmitting the output of the engine to the transmission, main drive wheels operatively connected to an output shaft of the transmission, auxiliary drive wheels, means comprising a transfer clutch for transmitting output of the transmission to the auxiliary drive wheels, the transfer clutch having a controllable clutch torque capacity, the system comprising:

a vehicle speed sensor provided to detect vehicle speed and to produce a vehicle speed signal;

means for providing an engine torque signal representative of engine torque dependent on an operating condition of the engine;

first control means responsive to the vehicle speed signal and the engine torque signal for engaging the transfer clutch at a torque capacity which is determined by a predetermined rate of the engine torque in accordance with the vehicle speed signal;

detector means responsive to a transfer clutch torque capacity reducing signal for producing a clutch torque reducing signal;

second control means responsive to the clutch torque reducing signal for gradually reducing the torque capacity determined by the first control means to a predetermined value.

2. The control system according to claim 1 further comprising means for producing oil pressure, the transfer clutch is a fluid operated friction clutch operated by the pressure of the oil, and said second control means gradually reduces the pressure of the oil in response to the clutch torque reducing signal for reducing the torque capacity.

3. In a control system for a four-wheel drive vehicle having an engine, a variably engageable main clutch connected for transmitting output of the engine to a transmission, main drive wheels operatively connected to an output shaft of the transmission, auxiliary drive wheels, and a variably engageable transfer clutch connected for transmitting the output of the transmission to the auxiliary drive wheels, the improvement comprising a vehicle speed sensor for producing a vehicle speed signal dependent on vehicle speed, a throttle position sensor responsive to engine load in a light load range and a heavy load range, respectively, for producing a throttle position signal depending on the ranges, respectivly, means for determining torque capacity of the main clutch for producing a main clutch torque signal dependent on the torque capacity of the main clutch, control means responsive to the vehicle speed signal, said main clutch torque signal and the throttle position signal for controlling torque capacity of the transfer clutch, in accordance with vehicle speed, to predetermined rates of said main clutch torque capacity in dependency on the throttle position signals respectively.

4. The control system according to claim 3, wherein said control means further comprises means for gradually reducing the transfer clutch torque capacity in response to an operating condition to prevent shock.

5. The control system according to claim 4, wherein said operating condition is opening of 4WD switch operatively connected to the control means.

6. A control system for a four-wheel drive vehicle having an engine, a transmission, means comprising a main clutch for transmitting the output of the engine to the transmission, main drive wheels operatively connected to an output shaft of the transmission auxiliary drive wheels, and means comprising a transfer clutch for transmitting output of the transmission to the auxiliary drive wheels, the transfer clutch having a controllable transfer clutch torque capacity, comprising:

a vehicle speed sensor provided to detect vehicle speed and to produce a vehicle speed signal dependent on the vehicle speed;

means for providing an engine torque signal representative of engine torque capacity and dependent on an operating condition of the engine; and control means responsive to the vehicle speed signal and the engine torque signal for engaging the transfer clutch at a transfer clutch torque capacity which is determined to be a predetermined rate of the engine torque capacity in accordance with the vehicle speed signal.

7. The control system according to claim 6, wherein said control means is for engaging the transfer clutch at a transfer clutch torque capacity which is determined to be a predetermined rate of the engine torque capacity at full throttle under certain vehicle conditions respectively.

8. The control system according to claim 6, wherein said vehicle conditions are the vehicle speed being greater than a predetermined value, the main clutch being fully engaged and the transmission being in a heavy load range, and respectively, the vehicle speed being lower than the predetermined value, an accelerator pedal of the vehicle being released, and the main clutch being partially engaged.

9. A control system for a four-wheel drive vehicle having an engine, a transmission, means comprising a variably engageable main clutch for transmitting the output of the engine to the transmission, main drive wheels operatively connected to an output shaft of the transmission, auxiliary drive wheels, means comprising a transfer clutch for transmitting output of the transmission to the auxiliary drive wheels, and the transfer clutch having a controllable transfer clutch torque capacity, comprising:

a vehicle speed sensor provided to detect vehicle speed and to produce a vehicle speed signal;

means for determining torque capacity of the main clutch for producing a main clutch torque signal dependent on the torque capacity of the main clutch; and first control means responsive to the vehicle speed signal and the main clutch torque signal for engaging the transfer clutch at a transfer clutch torque capacity which is determined to be a predetermined rate of the main clutch torque capacity in accordance with the vehicle speed signal.

10. The control system according to claim 7, further comprising detector means responsive to a transfer clutch torque capacity reducing signal for producing a transfer clutch torque reducing signal; and second control means responsive to the clutch torque reducing signal for gradually reducing the transfer clutch torque capacity determined by the first control means to a predetermined value.

* * * * *